UNITED STATES PATENT OFFICE.

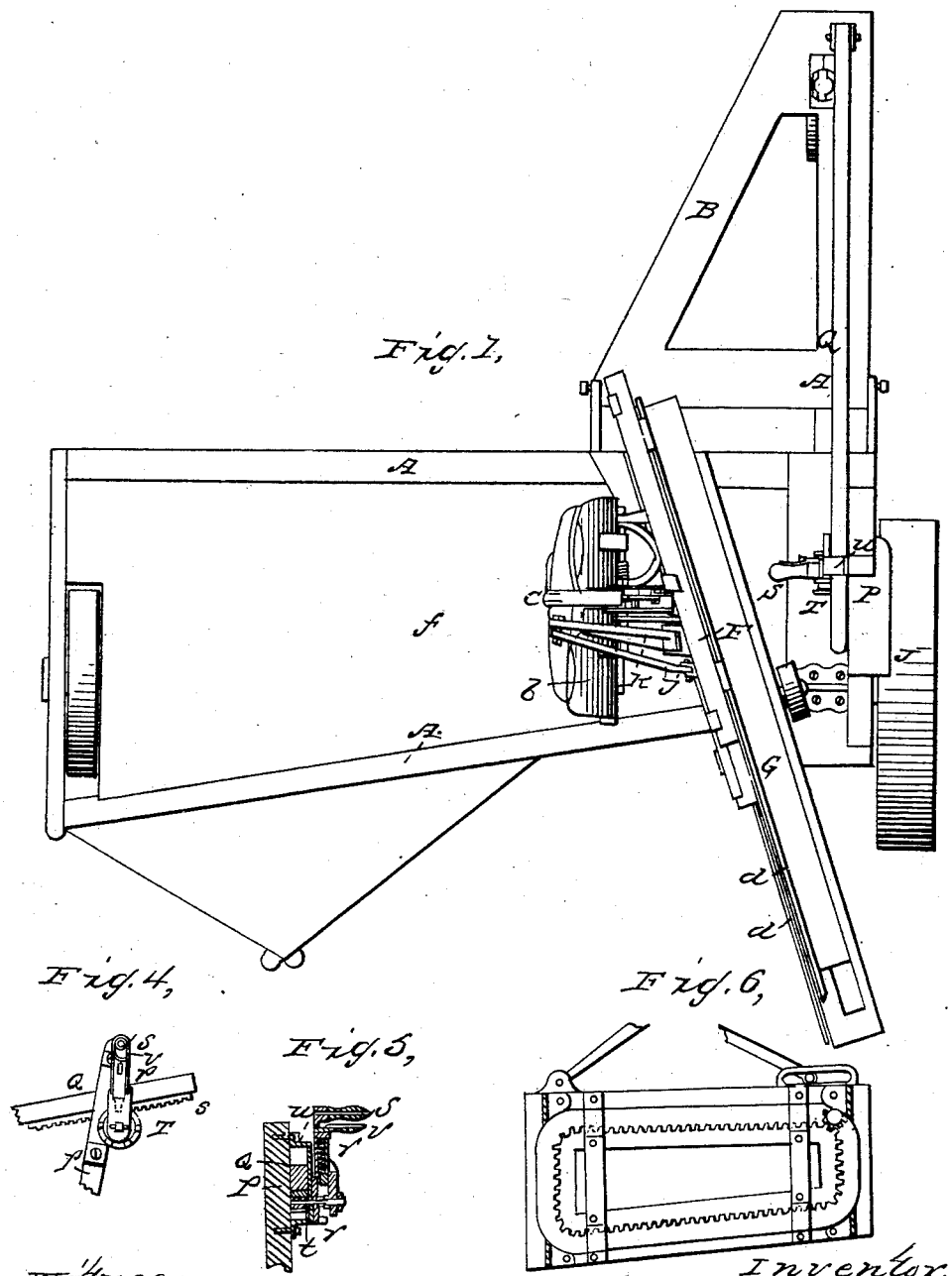

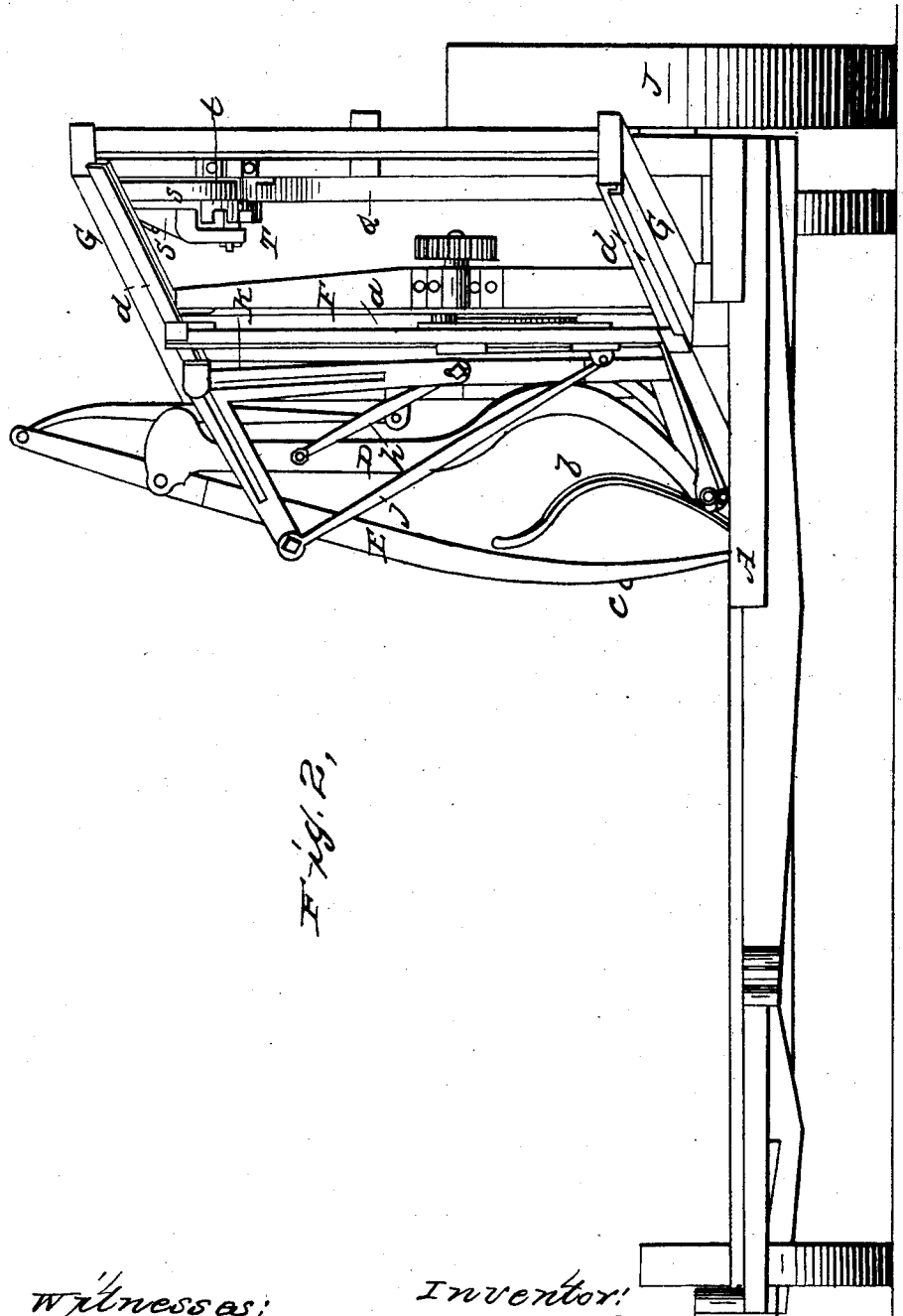

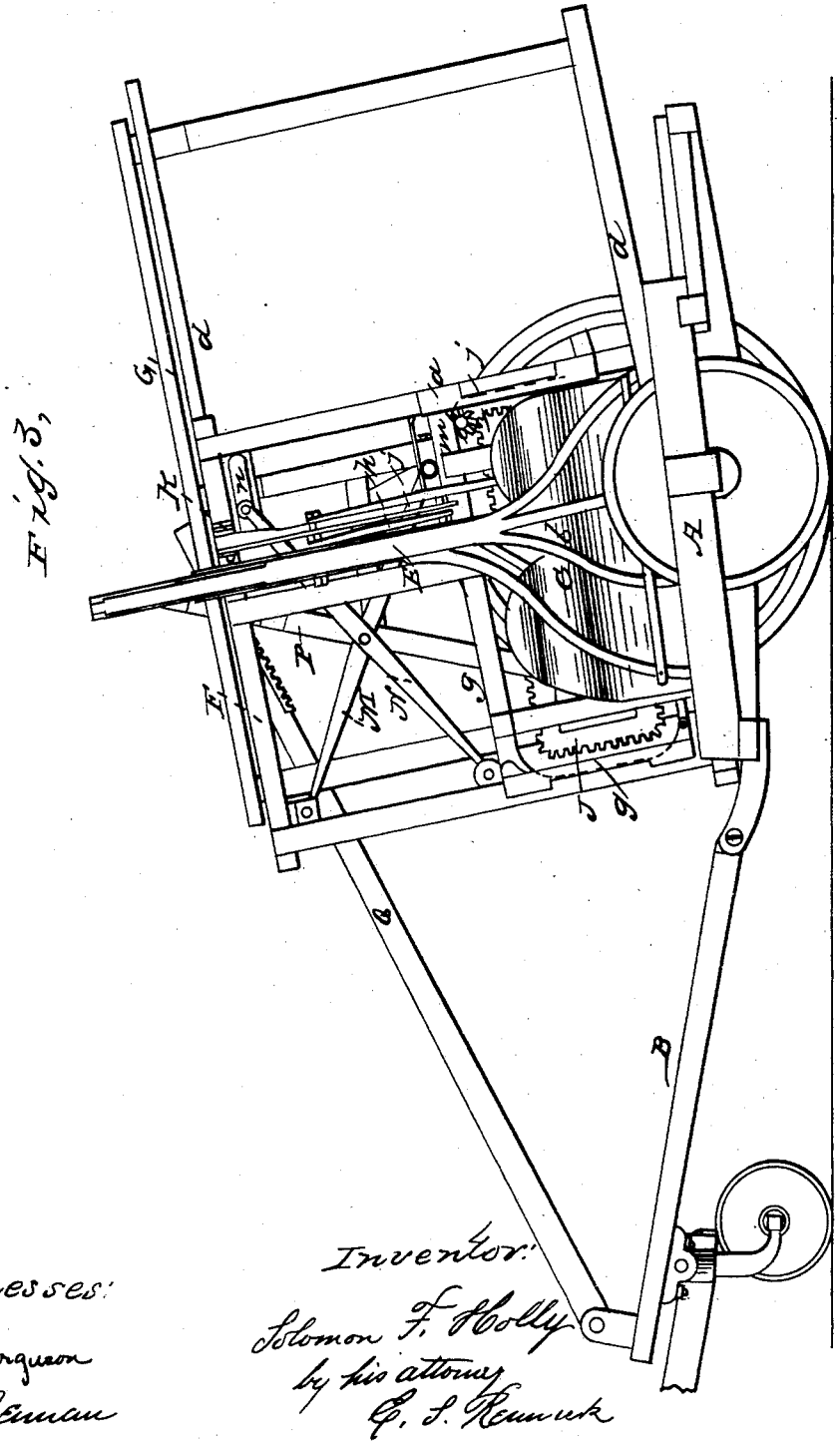

SOLOMON T. HOLLY, OF ROCKFORD, ILLINOIS.

IMPROVEMENT IN HARVESTERS.

Specification forming part of Letters Patent No. 35,096, dated April 29, 1862.

*To all whom it may concern:*

Be it known that I, SOLOMON T. HOLLY, of Rockford, in the county of Winnebago and State of Illinois, have invented certain new and useful Improvements in Harvesting-Machines; and I do hereby declare that the following is a full, clear, and exact description of my invention, reference being had to the accompanying drawings, in which—

Figure 1 represents a plan of a Manny harvester with my improvements applied thereto. Fig. 2 represents a rear elevation of the same. Fig. 3 represents a side elevation of the same, and Figs. 4, 5, and 6 represent detached parts of the mechanism of the same.

My invention consists of several parts, some of which may be used separately; but I prefer to use all of them in the same machine.

The first part of my invention has reference to the discharge of grain from the platform on which it falls by means of a rake, which moves bodily from the platform, instead of swinging off of the same in the arc of a circle; and its object is to permit the grain to be deposited upon the ground at a farther distance from the standing grain than has been customary with this class of automatic rakes. To this end this part of my invention consists in arranging the guides for the rake-carriage at an acute angle with, or, in other words, diagonally, to the line of progression of the machine, so that as the rake-carriage is moved off the platform the gavel is carried by the rake away from the standing grain.

The mode of operation of the second part of my invention is to move the rake-teeth of the extended rake forward over the platform in a line parallel, or thereabout, with the line of progression of the machine, while the rake-carriage moves forward in a line forming an acute angle with the line of progression of the machine. As I prefer to operate the rake by means of a quadrilateral rack driven by a pinion, my new mode of operation is effected in the machine represented in the drawings by combining the first part of my invention with a quadrilateral rack that is narrower at its rear end than at its forward end.

The object of the third part of my invention is to insure the parallel movement of the quadrilateral rack of a rake mechanism in rising and descending; and it consists in the combination of said rack (or its equivalent for operating the rake) with a pair of crossed levers, one of which is connected with the moving rake-carriage and the other with the quadrilateral rack or its equivalent.

The object of the fourth part of my invention is to enable the conductor of the harvester to raise or lower the cutter-bar and operate the locking mechanism for holding the same in any desired position by the application of one hand only. This part of my invention consists in combining a crank-handle for operating a pinion that moves a rack on the thrust-bar of the reach (or its equivalent for moving the cutter-bar) with a spring-bolt and circular nosing for securing the crank in any desired position.

The general arrangement of the cutting apparatus and draft of the harvester represented in the accompanying drawings is substantially the same as that known as the "Manny harvester," A being the main frame of the carriage that sustains the cutting apparatus, and B the reach, supported at its front end by a caster-wheel and hinged to the cutter-carriage at its rear end. The rake C of this machine has two gathering-arms, D and E, the main arm D being hinged near its lower end to a rake-carriage, F, and being provided with a palm, *b*, against which the gavel of grain is compressed. The carriage is constructed to slide crosswise on guides *d d* to and fro over the cutter-carriage to carry the rake off and onto the platform *f*, on which the cut grain is received as it falls. The guides of this rake-carriage are sustained by a frame, G.

In the operation of the machine the rake-teeth are drawn along the platform from the divider side of the machine toward the draft side by the drawing together of the two gathering-arms D E. The rake-carriage, with the rake and gavel, is then moved backward on the guides, to carry the rake and gavel off the platform. When this is accomplished, the gathering-arms are extended to drop the gavel and extend the rake-teeth toward the divider side of the machine, and then the rake-carriage is moved forward to carry the extended rake over the platform with its teeth in the proper positions to commence gathering a new gavel. These several movements of the rake and rake-carriage are effected by means of a quadrilateral rack, H, driven by a pinion, $a$, that is mounted on a shaft to which motion is imparted by a belt or other suitable means from the shaft of the driving-wheel J. When the pinion is acting on the hinder side of the rack, it depresses it without moving it horizontally, and this movement is used to draw the rake-teeth toward the palm. When the pinion is acting on the upper side of the rack, it moves the rack and the rake-carriage with which it is connected backward to carry the rake off the platform. When the pinion is acting on the hinder side of the rack, it raises it without moving it horizontally, and this movement is used to extend the rake. When the pinion is acting on the under side of the rack, it moves the rack, the rake-carriage, and the rake forward over the platform. In order that the rack-teeth may not escape the action of the pinion-teeth, the rack is surrounded by a frame, $g$, whose inner periphery bears upon a friction-wheel mounted on the end of the pinion-shaft. In order that the rake-arm may be drawn in and extended by the depression and elevation of the rack, the main gathering-arm D is connected by a rod, $h$, with an elbow-lever, K, which is pivoted to the rake-carriage, and the other arm of the elbow-lever is connected by a rod, $j$, with the frame of the rack.

In order to carry into effect the first part of my invention, the guides $d$ $d$ of the rake-carriage are inclined to the direction in which the machine progresses, or, in other words, the line of direction $k$ $k$ of the guides forms an acute angle with the line $l$ $l$, in which the machine is drawn forward; hence when the rake-carriage is moved back upon its guides it is at the same time moved farther from the divider side of the machine, and the rake carrying the gavel is moved farther from the standing grain. As the gavel is dropped by the extension of the rake-arms after the rake-carriage with the rake has reached its farthest backward position, the gavel is dropped farther from the standing grain than it would have been if the guides of the rake-carriage were not inclined in the manner above described. When the rake-carriage is moved forward, it passes onto the platform in an inclined line, and if the extended rake-teeth were moved in the same manner they would disturb the grain lying on the platform. The second part of my invention prevents such disturbance. In order to carry it into effect, the front side of the rack is made longer than the hinder side, and the lower side of the rack is inclined to the guides of the rake-carriage, the rack being thus tapering toward its hinder side; hence the rake-teeth are extended by the action of the pinion on the front side of the rack until they are directly behind the position which they are to occupy on the platform, and as the rake-carriage is moved forward the inclination of the lower side of the rack causes it to be raised slightly as well as moved forward. As it rises the gathering-arms are contracted, and the inclination of the lower side of the rack produces such a contraction of the arms that while the rake-carriage is moved forward upon its guides at an acute angle with the line of draft the extended rake-teeth are moved forward parallel with the line of draft, and consequently pass onto the platform without disturbing the grain.

In machines having a quadrilateral rack to operate the rake the action of the pinion alternately at the opposite ends of the rack tends to cause it to cant or move angularly with much friction on the vertical guides. The third part of my invention is designed to prevent this tendency. In order to carry it into effect, a pair of cross-levers, M N, are provided. One of these levers, N, is pivoted at one of its ends to the rack-frame $g$, and its other end is fitted with a roller that traverses in a slotted plate, $n$, secured to the rake-carriage. The other lever, M, is pivoted at one end to the rake-carriage, and its other end is fitted with a roller that traverses in a slotted plate, $m$, secured to the rack-frame, the lines passing through the center of the pivot of each lever and the central line of the slot in which the roller of the opposite lever traverses are parallel, and the two levers are pivoted together at their longitudinal centers. From this combination of the rack with the carriage by means of the cross-levers thus described the movement of either end of the rack is immediately propagated by the cross-levers to the other end thereof, and the rack in moving up and down is compelled to maintain its parallelism, because the centers of the rollers in the slots are compelled to rise and fall in accordance with the centers of the pivots at the other ends of the cross-levers.

In the machine represented in the drawings the frame of the cutter-carriage is tipped forward or backward to lower and raise the cutter-bar; and this tipping is effected by combining the reach B with an upright frame, P, (secured to the cutter-carriage,) by means of a thrust-bar, Q, in such manner that by drawing the thrust-bar backward the distance between its connection with the reach and its connection with the upright frame P is shortened, and the cutter-bar is lowered, and by pushing the thrust-bar forward, this distance is lengthened and the cutter-bar is raised. The hinder end of the thrust-bar is locked fast in any required position to hold the cutter-bar in its place by means of a spring-bolt, which must be disengaged before the thrust-bar is moved. The fourth part of my invention enables the operator to disengage the spring-bolt, move the thrust-bar, and permit the re-engagement of the bolt by applying his hand to a crank-handle. In order to carry it into effect, the thrust-bar is fitted with a longitudinal rack, $s$, whose teeth engage with those of a pinion, $t$, secured to a shaft that turns in boxes made fast to the upright frame P, and the teeth of the rack are prevented from disengaging with those of the pinion by the guide $u$, through which the thrust-bar travels. The pinion-shaft is fitted with a crank-handle, S, by which it can be turned to move the rack and the thrust-bar, to which the rack is made fast. The crank is also fitted with a spring-bolt, $r$, which slides longitudinally in it, and a circular nosing, T, having a number of notches in it for the end of the spring-bolt to engage in, is secured to the machine concentrically with the pinion-shaft, so that the spring-bolt can engage in any one of the notches opposite which it may be placed by turning the crank carrying it. The spring-bolt is provided with a handle, $v$, that is parallel with the crank-handle, and is at a short distance therefrom, so that when the conductor of the machine grasps the crank-handle he at the same time grasps the bolt-handle, and by closing his hand withdraws the spring-bolt from that notch of the nosing with which it was engaged. The bolt being thus disengaged, the conductor can raise or lower the cutter-bar by turning the crank, and then, by relaxing his grasp, can permit the spring-bolt to re-engage in that notch of the nosing which it is opposite to, thus locking the thrust-bar and securing the cutter-bar in its new position.

Having thus described the practical application of my improvements to a harvester, what I claim as my invention, and desire to secure by Letters Patent, is—

1. The arrangement of the guides of the rake-carriage at an acute angle with the line of progression of the machine, so as to carry the rake farther from the divider side of the machine as it is moved backward on the guides, substantially as set forth.

2. The combination of inclined guides for the rake-carriage, substantially as set forth, with mechanism for moving the rake-teeth forward in a line parallel, or thereabout, with the line of progression of the machine, substantially as set forth.

3. The combination of the quadrilateral rack of a rake mechanism with the frame in which it moves by means of a pair of crossed levers, substantially as set forth.

4. The combination of a crank-handle for operating the pinion of the raising and lowering mechanism of the cutter-bar with a spring-bolt and circular nosing, substantially as set forth.

In testimony whereof I have hereunto subscribed my name.

SOLOMON T. HOLLY.

Witnesses:
SILAS G. TYLER,
WM. A. KNOWLTON.